United States Patent [19]

Talmage, Jr. et al.

[11] Patent Number: 4,687,885
[45] Date of Patent: Aug. 18, 1987

[54] ELECTROGRAPHIC TOUCH SENSOR WITH Z-AXIS CAPABILITY

[75] Inventors: John E. Talmage, Jr., Oak Ridge; William A. Gibson, Knoxville, both of Tenn.

[73] Assignee: Elographics, Inc., Oak Ridge, Tenn.

[21] Appl. No.: 710,080

[22] Filed: Mar. 11, 1985

[51] Int. Cl.[4] .............................................. G08C 21/00
[52] U.S. Cl. ..................................................... 178/18
[58] Field of Search .............................. 179/18, 19, 20

[56] References Cited

U.S. PATENT DOCUMENTS

4,198,539 4/1980 Pepper .................................... 178/18
4,500,749 2/1985 Khoshnevis ........................... 178/18

Primary Examiner—Stafford D. Schreyer
Attorney, Agent, or Firm—Pitts and Brittian

[57] ABSTRACT

An electrographic touch sensor having Z-axis capability. In one embodiment, a uniform resistive coating is applied to one surface of a substrate and it is within this coating that orthogonal electrical fields are produced using suitable electrodes and voltage applications to give coordinates of a selected position. Overlying the resistive coating is a flexible pickoff sheet having a conductive layer facing the combination. Interposed between the resistive coating and the conductive layer is an array of a material having a substantially greater resistivity than that of the resistive coating. Signals corresponding to the X- and Y-coordinates of a touched point on the sensor are obtained in a substantially conventional manner using an amplifier and an analog to digital converter. If desired, a Z-axis component signal due to pressure/force can be obtained in a separate part of the measuring cycle. This Z-axis signal is inversely related to a change in the effective contact resistance between the resistive coating and the pick-off sheet caused by the pressure/force. The change in this contact resistance is "enhanced" by the high resistance material such that different values of pressure/force can be determined. Numerous other embodiments are described including two resistive sheet sensors and enhancing materials that are considered to be insulators.

30 Claims, 5 Drawing Figures

ELECTROGRAPHIC TOUCH SENSOR WITH Z-AXIS CAPABILITY

DESCRIPTION

1. Technical Field

The present invention relates to devices for encoding or determining the coordinates of a location in a multidimensional system, and more particularly to an electrographic touch sensor whereby such points can be determined or selected and whereby a signal can be generated relative to the pressure/force applied at the particular point.

2. Background Art

There are many fields of technology where it is desirable to generate electrical signals that are proportional to some physical point in a multidimensional coordinate system. For example, it is often desirable to accurately reconstruct graphs or other technical data representation to store such data in computers, or to process such data in a particular manner.

A device which has come into use for this purpose is known as an electrographic touch sensor wherein orthogonal electrical fields are produced; one in an X direction and one in a Y direction in a coordinate system. Contact of a sensor at a specific location with a finger or other object causes the generation of a signal that is representative of the X- and Y- coordinates of that particular point.

Orthogonal X and Y electrical fields of devices of this type have been generated by numerous types of systems. For example, parallel electrodes have been placed on opposite edges on each of two spaced apart sheets. The electrical potential in one direction is generated in one sheet with a voltage supplied to one set of electrodes, and the orthogonal field generated in the second sheet is produced in a similar manner. In another configuration, the orthogonal electrical fields are generated in a single sheet with various configurations of electrodes along the edges of the sheet, and the potential is applied to these electrodes in a proper timed sequence. One group of single sheet sensors utilize resistive type electrodes in contrast to another group that utilize diodes at each electrode.

There are other applications for touch sensors where information other than just coordinates of a point are to be selected or determined. For example, it is frequently desired to take some action by equipment based upon a selected pressure/force applied to the sensor. Typically this can be utilized to move a cursor to a specific position on a display screen and cause execution of a function as a result of additional applied pressure/force.

One sensor system that is known to accomplish at least a portion of such action is described in U.S. Pat. No. 3,798,370, issued to G. S. Hurst, on Mar. 19, 1974. This patent has a common assignee to the present invention. In that patent is described a sensor for generating signals corresponding to the X- and Y-coordinates of a point. In addition, the probe provided for contacting the sensor to determine those signals has a pressure switch therein whereby the output signals are transmitted to associated equipment only when sufficient pressure is applied to the sensor via the probe to close the switch. This device, however, does not produce a signal related to the value of the pressure.

A sensor having built-in capability to determine pressure or force directed against the sensor is described in U.S. Pat. No. 4,198,539, issued to W. Pepper, Jr., on Apr. 15, 1980. In that patent, a "switch" layer, whose resistance varies as a function of pressure, is added as a separate layer to the sensor. This extra layer, having conductive plates separated by carbon granules, is electrically separated from the resistive layer in which the orthogonal fields are produced. This construction is shown in FIG. 12 and described in Column 9 of the patent. Such structure complicates the construction of a sensor by adding two or three more layers and thus significantly adds to the cost of producing the sensor.

It will be recognized that there are numerous pressure sensitive switches that could be substituted for the separate layer as used by Pepper. Typical of these switches are described in U.S. Pat. Nos. 4,314,227 and 4,315,238 issued to F. Eventoff on Feb. 2, 1982 and Feb. 9, 1982, respectively. These switches employ two conductive layers with a pressure sensitive semiconductor composition positioned therebetween.

Accordingly, it is a principle object of the present invention to produce an electrographic touch sensor for generating signals corresponding to the X- and Y-coordinates of a point, and to further provide means for generating a signal corresponding to specific pressure/force in the Z-direction on the sensor at that point.

It is also an object to provide a three-dimensional touch sensor having a reduced number of layers as contrasted to the aforementioned '539 patent.

It is another object of the present invention to provide a touch sensor wherein the effective resistance of the sensor decreases as a function of force/pressure in a manner to differentiate between various values of force/pressure.

These and other objects of the present invention will become apparent upon the consideration of the following description with reference to the drawings referred to therein.

DISCLOSURE OF THE INVENTION

According to the present invention, there is provided a sensor unit for generating signals representing the X- and Y-coordinates of a contact point. This sensor utilizes conventional one or two resistive sheet construction and is formed using generally conventional technology. In an embodiment having a single resistive sheet there is a conductive second sheet for the sensor that is used for contacting the resistive sheet. Electrodes are in contact with the resistive sheet or sheets, and voltages are applied to appropriate groups of the electrodes attached to the resistive sheets to produce orthogonal electrical fields in the resistive sheet(s).

Interposed between the two sheets that make up either embodiment of the present invention is a layer of an "enhancing" material (defined hereinafter), which material affects the effective contact resistance between the sheets such that this effective contact resistance decreases at a substantially reduced relationship with respect to the applied pressure. In this way there is a substantial difference in the effective contact resistance at differing pressures sufficient to differentiate between these pressures. The enhancing material has a resistivity substantially greater than the resistivity of the sheet(s), and can be chosen from a variety of compositions including compositions considered to be insulators. Futhermore, a variety of spacial distributions of these materials can be utilized. Circuitry connected to the sensor determines X-and Y-coordinates of a point contacted on the sensor as well as the pressure/force applied at that point.

DETAILED DESCRIPTION OF THE INVENTION

It is well recognized that the resistance between two surfaces loosely in contact can be reduced by pressing these surfaces together, and that the degree of reduction is related to the area of contact and the force/pressure value. This effect can be observed in conventional touch sensors. However, this change of resistance is very abrupt upon the application of a finger or other object applied to the sensor during generation of X- and Y-coordinate signals.

Figure 1:
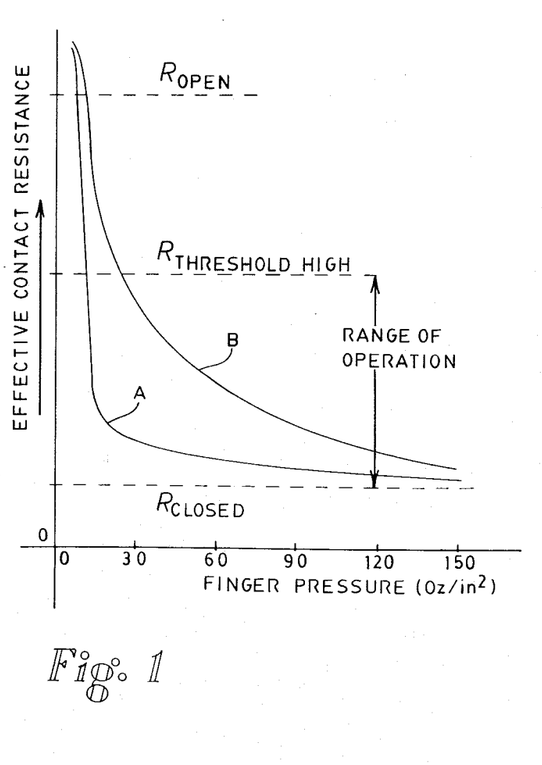
FIG. 1 is a graphical representation of the typical effective resistance generated by pressure/force applied to the sensor of the present invention (Curve B) as contrasted with a sensor not using an enhancement material (Curve A).

This is illustrated in Curve A of FIG. 1. Plotted therein is the effective resistance between the two surfaces of the sensor as a function of applied finger pressure. The effective contact resistance $R_{open}$ is typically greater than 1 Megohm when the sheets are separated or lightly in contact without finger pressure. It may be seen that with a small pressure (e.g., 8–15 oz/in$^2$) the effective resistance passes through a high threshold value (typically 10–50 Kohm) to a "closed" value of nominally less than 10 Kohm. The exact threshold levels are set by a controller in the associated circuitry. The high threshold level is nominally utilized to begin the taking of coordinate signals. Because the finger cannot recognize the difference in this small pressure range (but large resistance range), there can be no discrimination of the pressure level in what is referred to herein as a Z-axis signal.

Now referring to Curve B of FIG. 1, plotted is an "enhanced" effective resistance curve as a function of applied finger pressure. It may be seen that relatively light pressures again produce a reduction of the effective contact resistance from the open value to the high threshold value. As stated above, this threshold pressure is suitable to obtain the X-, Y-, and Z-coordinate signals. However, considerable extra force is then required to approach the "closed" value, i.e., the change in the effective contact resistance is reduced relative to the amount of pressure/force. The sensor described hereinafter achieves this enhanced characteristic whereby a valuable Z-axis signal is producible upon application of this further pressure while continuing to obtain the X and Y signals. If the slope of the curve between the threshold value and the closed value is sufficiently lowered with suitable electronic circuitry, a multiplicity of levels can be identified as a function of pressure.

It should be understood that although typical values are given relative to Curve A and B, the actual values for any specific sensor will depend considerably upon the materials of construction and the setting of a sensor controller. All the response curves, however, will be similar in shape. It should also be understood that if the contact resistance is a part of a signal generating circuit as discussed hereinafter, a decrease in the resistance provides an increase in the resultant output signal.

Figure 2:
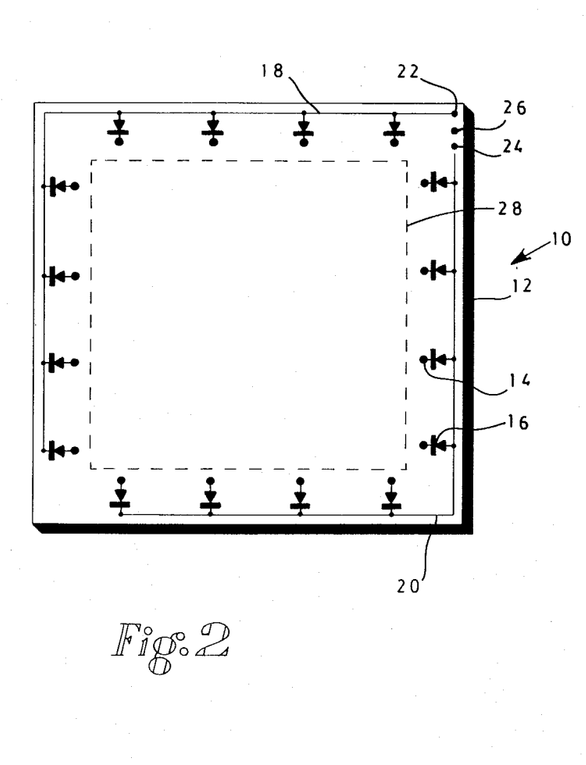
FIG. 2 is a layout of a typical construction of a base unit showing the electrodes and system for applying voltages to those electrodes for use in one embodiment of the present invention.

Referring now to FIG. 2, shown therein is one embodiment of a base unit 10 for the present invention. A substrate 12 is provided typically in the form of a printed circuit board (PCB). Any suitable opaque or transparent substrate, as well as a rigid or flexible substrate, however, can be used. Spaced inwardly from each edge of the PCB are a plurality of contact pads or electrodes 14. A diode 16 is provided for connection to each of the pads 14, with the opposite end of each diode being joined to appropriate connecting traces 18, 20, as shown. These traces 18, 20 terminate in terminals 22, 24, respectively. A third terminal 26 on the PCB 12 is shown: this is for a purpose described hereinafter. The area to be active for the touch sensor is identified by a dashed line 28. This construction is substantially state-of-the-art, and persons skilled in the art will recognize the need for an appropriate number of pads (and diodes), and their spacing, for particular applications. Furthermore, it will be recognized by persons versed in the art that resistive electrodes, in contrast to those illustrated, can be used such as those described in aforementioned U.S. Pat. No. 3,798,370, or in our copending patent application Ser. No. 685,348. Also, as discussed hereinafter, a sensor using two sheets of resistive material can be employed in the present invention.

Figure 3:
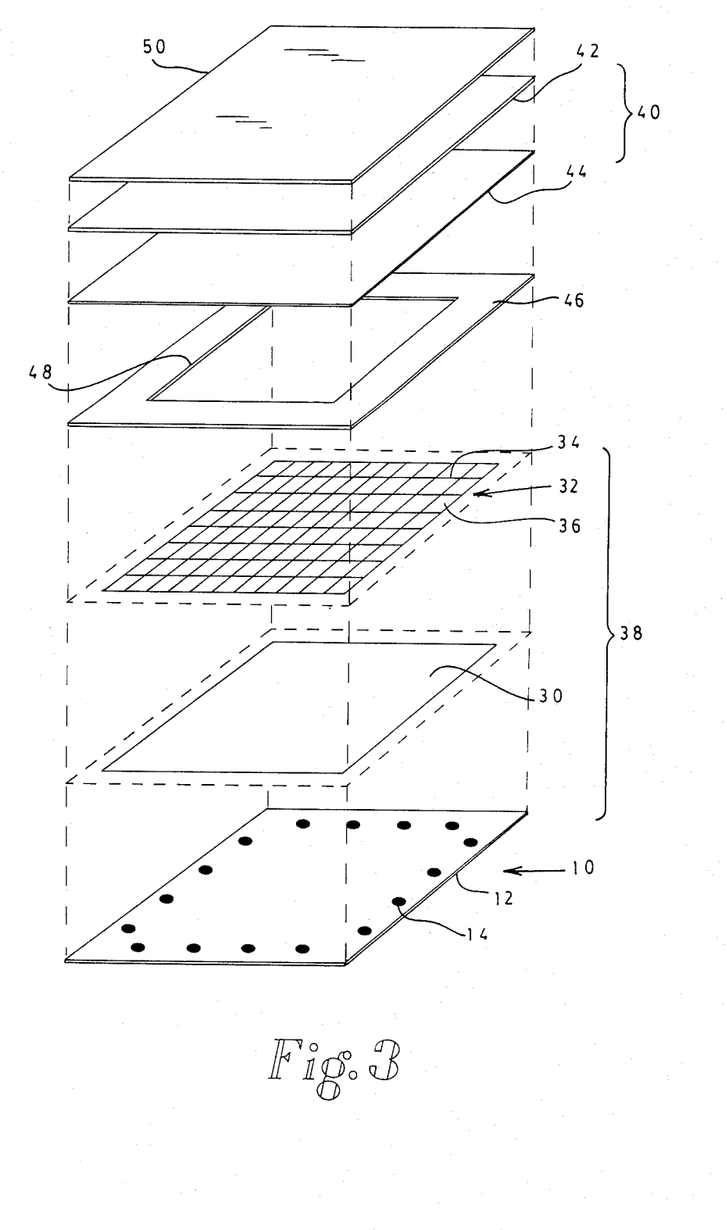
FIG. 3 is an exploded view of a device constructed according to this embodiment of the present invention.

An exploded view of one embodiment of the sensor of the present invention is illustrated in FIG. 3. The aforementioned base 10, as shown in FIG. 2, is illustrated with only the substrate 12 and the electrodes 14 shown thereon. The diodes, the connecting traces, and the connector pins are not shown for simplicity in this figure. Deposited upon the substrate 12 is an electrically resistive coating 30, such that the coating 30 contacts the electrodes 14. This resistive coating has a uniform resistivity in a range between 50 and 20,000 ohms per square. Typically, the value is about 100 ohms per square. Such a coating can be applied using Electro-Science Laboratories, Inc.'s ink Type RS-16112 applied in any suitable manner to the substrate 12.

On top of this resistive coating 30 is applied a high resistive grid 32 made up of, in this embodiment, a rectangular array of narrow strips 34 which define small open spaces 36. The resistivity of this grid is chosen to be substantially greater than that of the resistive coating, e.g. a factor of 1,000 or greater. The material for this resistance grid is typically a polymer thick film such as Acheson Colloids Company's ink Type PTF-500 with a small amount of PTF-502 to produce a resistive grid having a resistivity greater than about 30K ohm-cm. This grid can be produced by any suitable means such as a silk screen process. This manner of applying the resistive coating 30 and the grid 32 to the substrate 12 causes these three portions to be a unitary item as illustrated by the bracket 38.

It should be pointed out that the high resistance grid 32 does not necessarily require the formation of a rectangular grid as shown. For example, a grid having circular openings will provide substantially the same function as the rectangular grid. Spaced-apart small islahds of high resistance material can be used also, as well as other materials described hereinafter.

Spaced above the unit 38 is a contact sheet 40. This contact sheet is typically made up of a flexible member 42, such as a sheet of rubber or other elastomer about 0.020 to 0.025 inch thick, or a plastic sheet about 0.005 to 0.015 inch thick, having applied thereto a conductive coating 44 on a face toward the grid 32. This conductive coating 44 also has elastomeric properties and can be typically produced using Emerson and Cuming, Inc.'s Eccocoat 258A applied to the sheet 42. It will be understood, also, that the aforementioned resistance grid 32 can be applied to the surface of conductive coating 44 rather than the resistive layer 30, if desired.

The contact sheet 40 can be attached using an frame-like layer 46 defining a central opening 48 which corresponds in size with the active region 28 indicated in FIG. 1. This attachment typically has a thickness of about 0.005 inch and is typically formed of an acrylic type adhesive whereby the contact sheet 40 is bonded around the periphery thereof to the unit 38. A light contact between the conductive coating 44 and the high resistance grid 32 may not be detrimental for some applications. However, if full separation therebetween is desired, this can be accomplished by conventional separators such as the dot separators shown in U.S. Pat. Nos. 3,911,215 or 4,220,815.

For practical operation, it is usually desirable to have a surface to be contacted by a finger or other object to have a different texture than a sheet 42. For this reason, this embodiment of the present invention is provided with an overlay sheet 50 which can be, for example, a sheet of about 0.010 inch polycarbonate or polyester plastic. This overlay sheet 50 is attached to the periphery of the sheet in any suitable manner, or can be bonded over the entire upper surface of the sheet 42.

Figure 4:
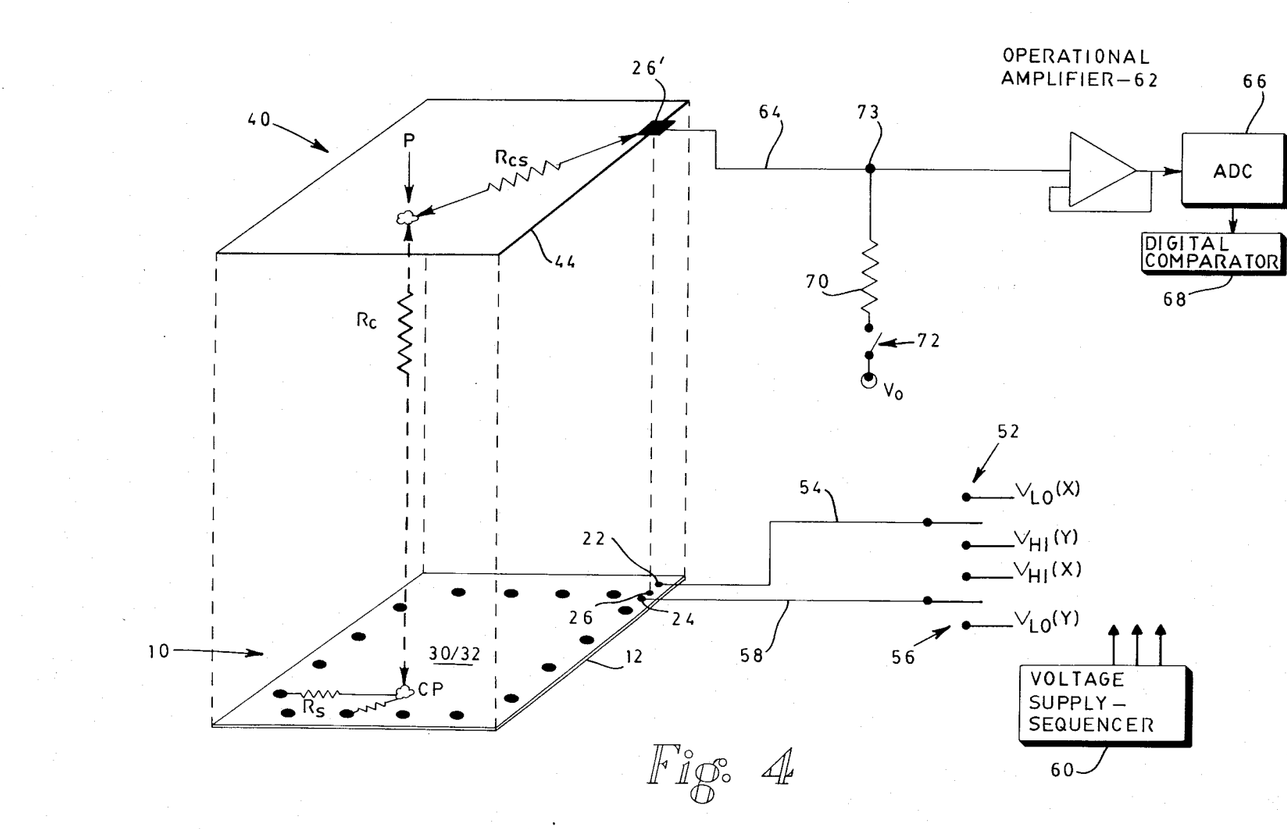
FIG. 4 is a schematic drawing of the sensor of this embodimment of the present invention showing means for determining coordinate position and contact pressure/force.

A schematic diagram of the touch panel assembly (of the embodiment illustrated in FIG. 3) and appropriate electronics is shown in FIG. 4. Only those portions of the touch panel assembly which influence the operation of the system are shown for simplicity. For example, the substrate 12 is shown upon which the resistive layer 30 and the resistance grid 32 are indicated as 30/32. Furthermore, the conductive sheet 44 of the contact sheet 40 is illustrated but in an exploded view. The contact 26' at the edge of the conductive layer 44 corresponds electrically to the terminal 26 on the substrate as shown in FIG. 2. In this embodiment, the terminal 22 is connected to switch 52 through lead 54. Switch 52, as indicated, provides for selectively applying either a low voltage for the X-coordinate potentials or a high voltage for the Y-coordinate potentials in the resistive layer. In a like manner, terminal 24 is connected to switch 56 through lead 58. Switch 56 provides for the selection of either the high voltage for the X-coordinate potentials or the low voltage for the Y-coordinate potentials. Generally the low voltage for both the X- and Y-coordinate potentials is zero. A conventional source of these voltages, and a sequencer for operating the switches, is shown at 60.

Terminal 26 (and thus 26') is connected to an operational amplifier 62 through lead 64. The output from the operational amplifier 62 is fed to an analog-to-digital converter (ADC) 66. The ADC can be connected to a digital comparator 68. The input to the operational amplifier 62 is also connected through resistor 70 and a switch 72 to a fixed selected voltage $V_O$ for purposes discussed below relative to the operation of the system.

The operation of this embodiment of the present invention can be described and best understood using a typical point P for contact of the sensor (see FIG. 4). A contact point CP is created between the conductive layer 44 and the combined grid/resistive layer (30/32). The grid has the same potentials as the resistive layer so that contact with the resistive layer is not required to obtain the X- and Y-coordinate signals. During time intervals for the determination of the X- and Y-coordinates of point P, switch 72 is open and switches 52 and 56 are set for applying appropriate potentials in either the X or the Y direction within the resistive layer 30 in a normal manner. The individual voltage signals related to X- and Y-coordinates of point P (i.e., CP) are thereby applied to the input of the operational amplifier 62 by way of the terminal 26 26' and lead 64. These signals are then transmitted via amplifier 62 to the analog-to-digital converter 66 for digitizing, display, and use in any suitable manner. The operation of the switches 72, 52, and 56 are controlled in proper sequence by the voltage supply-sequencer 60 or corresponding circuitry.

During another time interval using this embodiment of the present invention, the switch 72 is closed and the switches 52 and 56 are moved to their low position which is, as stated above, conventionally ground potential. With the switches in this cOndition, the voltage presented at the input to the operational amplifier 62 is that at point 73 in a voltage divider network, with one side of this network being resistor 70 (supplied by fixed voltage $V_O$), and the other side made up of a sum of the resistances shown on the touch panel assembly schematic. Specifically, these are resistances $R_{CS}$ (which is the resistance from the contact point to the terminal 26'); $R_S$ (which is the resistance from the contact point on the resistive layer and grid 30, 32 to the terminals 22 and 24); and $R_C$ (which is the variable effective contact resistance between the conductive layer 44 on the contact sheet 40 and the unit 38, namely the resistive layer 30 and/or the grid 32. The voltage established by this voltage divider at juncture 73 is applied to amplifier 62 and then processed by the analog-to-digital converter 66 and transmitted to any host device as the Z-coordinate (pressure/force related) reading. As stated heretofore, a decrease in the value of the effective contact resistance is reflected by an increase in the Z-coordinate signal. The digital comparator 68 shown in FIG. 4, which receives the signal from the analog-to-digital converter 66, is used between the X, Y or Z readings to monitor the open or closed circuit conditions between the contact sheet 44 and the unit 38 in order to determine proper operation of the present touch panel.

The circuit components in FIG. 4 contained within the electronics portion(s) of the figure, including the switches, are all conventional devices. Specific commercial units for these applications would be well known by persons skilled in the art. They can be singular electronic units or can be combined in various configurations to accomplish the same functional results as stated above.

Figure 5:
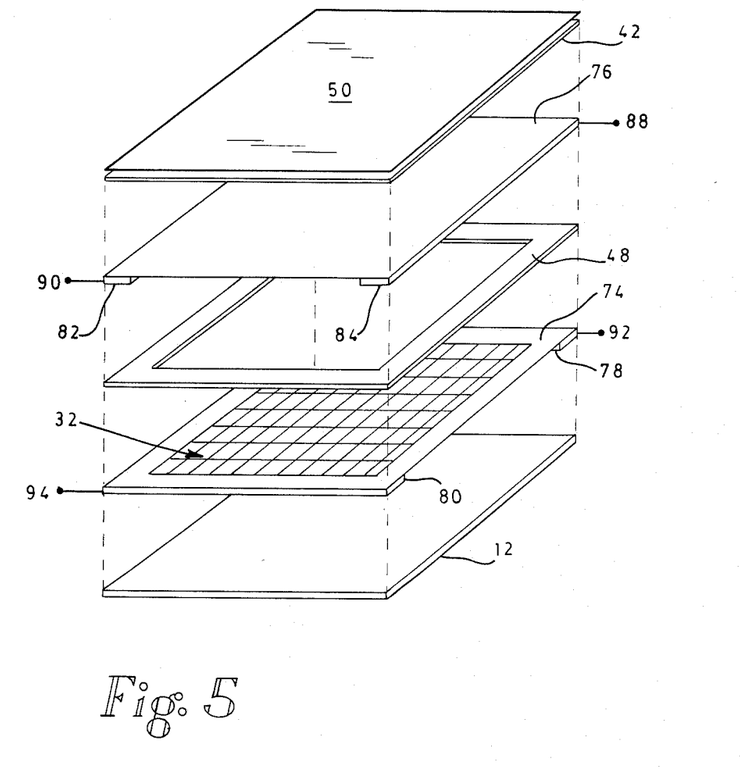
FIG. 5 is an exploded view of another embodiment of the present invention in which two resistive sheets are utilized for the generation of X- and Y-coordinate signals, and the enhancement material is placed between the sheets in order to generate the Z-axis (pressure/force) signal.

Referring now to FIG. 5, shown therein is an exploded view of another embodiment of the present invention. All components serving the same function as in the embodiment of FIG. 3 carry the same identifying number. For example, the cover sheet is made up of an elastomer sheet 42 and there is a top sheet or overlay 50. It also can utilize a substrate 12. As in FIGS. 2 and 3, this substrate can be an elastomer if desired.

In this embodiment the coordinate signals are produced using a pair of spaced apart resistive sheets 74, 76. Electrodes 78, 80 along opposite edges of resistive sheet 74 provide for the application of voltages via leads 92, 94 to the sheet. In a like manner, electrodes 82, 84 are in contact with the opposite edges of resistive sheet 76 whereby orthogonal fields (relative to those in sheet 74) can be generated by applying appropriate voltages via leads 88, 90. A frame-shaped mounting material 48, as in FIG. 3, is shown between sheets 74 and 76. As discussed with regard to FIG. 3, if desired, appropriate separation means (not shown) can be used to prevent inadvertent contact between the resistive sheets 74, 76. It will be recognized that the resistive sheet 76 can be an integral part with the elastomer sheet 42 and overlay 50, and the resistive sheet 74 can be an integral part with the substrate 12.

The "grid" (or other appropriate distribution) of high resistance material 32 is shown in this figure as applied to the surface of resistive sheet 74 facing the second resistive sheet 76. In this manner, it is contacted by the second resistive sheet 76 whenever pressure/force is applied to a point on the overlay 50. Alternatively, the high resistance material 32 can be applied to the underside of resistive sheet 76 facing resistive sheet 74. This embodiment functions essentially the same as the embodiment of FIG. 3 and the circuit diagram of FIG. 4 except for the two-sheet X and Y voltage applications.

Described hereinabove, with regard to the two detailed embodiments, is one type of enhancing material useful in the present invention. Specifically, this uses an "array" of material having a resistivity typically more than 1000 times that of the resistive layer(s) of the sensor placed between the two sheets of the sensor. Using the embodiment of FIG. 3 as an example, the array 32 of high resistance material functions in at least one of two ways. Initially under light pressure from a finger, only the highly resistive array 32 is contacted by the contact sheet 44. This highly resistive array is of the same voltage level as the underlying lower resistive coating 30 and the X- and Y-coordinate information is obtained. As pressure is increased, the contact sheet 44 is pushed through the array and into direct contact with the lower resistance coating 30, resulting in a drop in the effective contact resistance and the production of a Z-axis signal. Alternatively, or in combination, the Z-axis effect also occurs even if the high resistivity array 32 spacing is such that the contact sheet 44 is not pushed through the array at these substantial finger pressures.

Another type of enhancing material is a distribution of materials normally considered to be insulators (having a very, very high resistivity). This distribution of particles can be applied to either the contact sheet 44 or the resistive layer 30 of FIG. 3 so that contact must be made in between these particles. This distribution can be created by carefully positioned insulator bumps or beads up to about 0.025 in., randomly distributed powder, or by a rough resistive surface which provides high resistance bumps. Alternatively, an insulating surface coating that has a large fractional area of pin holes can be used. These effects are substantially enhanced by selecting a substrate material or contact sheet material, or both, which is elastomeric so that these sheets tend to extrude around the insulating particles, and the insulating particles tend under pressure to retract into the elastomeric sheet(s).

Still another demonstrated type of "enhancer" is composed of a thin solid film of material which has a very high resistance in bulk, such as a lacquer paint. This must be applied in a very thin layer, e.g., five hundred to five thousand Angstroms, so that it is possible to pass electrical charge through the material, possibly by either ohmic conduction or dielectric breakdown. The mechanism by which this layer enhances the effective contact resistance versus pressure is not fully understood. It should be understood that all of these materials are applicable to two resistive sheet sensors as shown in FIG. 5.

In addition to the effects of enhancing materials used in the present invention to affect the contact resistance, advantage is made of the change in contact area upon that resistance. For example, as finger pressure against the sensor is increased, the finger flattens and brings more area into contact on and within the sensor. As the contact area increases, the contact resistance decreases.

From the foregoing, it may be seen that a position sensitive device has been described having Z-axis capability i.e., provides a signal related to applied pressure/force. This device achieves this capability with a simplified construction thereby producing an accompanying reduction in cost over devices in the prior art designed to accomplish similar results. Although only certain specific embodiments are described herein, it will be recognized by persons versed in the art that the teaching contained herein will permit the fabrication of other devices which will perform as described. Accordingly, this invention is limited only by the claims which are appended hereto, and their equivalents.

We claim:

1. An electrographic touch sensor for generating signals of two-dimension coordinates of a contact point on said sensor, and having a capability of generating signals related to pressure/force applied at such point, which comprises:

a resistive sheet capable of having electrical potentials introduced therein extending across such sensor, said resistive sheet defining a perimeter and having an inner and outer surface;

a further sheet capable of having electrical potentials introduced therein positioned proximate said resistive sheet and extending across such sensor, said further sheet defining a perimeter substantially conforming to said perimeter of said resistive sheet, and having an inner surface facing said inner surface of said resistive sheet, and an outer surface, said further sheet adapted to move toward said resistive sheet upon the application of pressure/force to such sensor at a selected point;

means for generating orthogonal electrical potentials within such sensor in X and Y directions whereby signals corresponding to X- and Y-coordinates of said selected point can be produced when electrical connection is made between said resistive and further sheets at said selected point; and enhancing means interposed between said inner surfaces of said resistive and further sheets whereby an effective contact resistance between said resistive and further sheets varies inversely with said pressure/force in a manner to differentiate between levels of pressure/force at said selected point such that said X- and Y-coordinate signals and a Z-coordinate signal can be obtained, said Z-coordinate signal being related to said pressure/force at said selected point.

2. The sensor of claim 1 wherein at least one of said resistive sheet and said further sheet is elastomeric.

3. The sensor of claim 2 wherein said further sheet is provided with an elastomer layer on said outer surface, said elastomer layer having an exposed surface, and further comprising an overlay sheet juxtaposed against substantially all of said exposed surface of said elastomer layer.

4. The sensor of claim 2 wherein said resistive sheet is an elastomer layer provided with a resistive coating on said inner surface, said resistive coating having a selected uniform resistivity.

5. The sensor of claim 1 wherein said resistive sheet is provided with a resistive coating on said inner surface, and with electrodes in contact with said resistive coating for receiving voltages to introduce said electrical potentials in said resistive coating.

6. The sensor of claim 5 wherein said electrodes are a plurality of contact electrodes spaced along said periphery of said resistive sheet in contact with said resistive coating, and wherein said further sheet is conductive on said inner surface thereof.

7. The sensor of claim 1 wherein said resistive sheet is provided with a resistive layer on said inner surface thereof and with electrodes in contact with said resistive layer along opposite edges thereof for receiving voltages to introduce said electrical potentials in said resistive layer between said oppositely-disposed electrodes; and wherein said further sheet is provided with a resistive layer on said inner surface thereof and with electrodes in contact therewith along opposite edges for receiving voltages to introduce electrical potentials in said resistive layer of said further sheet, said electrodes of said further sheet being oriented orthogonally with said electrodes of said resistive sheet.

8. The sensor of claim 2 wherein said enhancing means is a distribution of a material having a resistivity substantially greater than the resistivity of said resistive sheet.

9. The sensor of claim 7 wherein said enhancing means is a distribution of a material having a resistivity substantially greater than said resistive layers on said resistive and said further sheets.

10. The sensor of claim 8 wherein said enhancing means is a grid array of resistance material applied to said resistive sheet on said inner surface thereof, said resistance material having a resistivity greater than the resistivity of said resistive sheet by a factor of at least 1,000.

11. The sensor of claim 8 wherein said enhancing means is an insulating powder interposed between said resistive sheet and said further sheet.

12. The sensor of claim 8 wherein said enhancing means is a layer of lacquer paint having a thickness of about 500 to 5000 Angstroms applied to said inner surface of one of said resistive sheet and said further sheet.

13. The sensor of claim 2 wherein said enhancing means is a plurality of spaced-apart buttons of an insulator material applied to said inner surface of one of said resistive sheet and said further sheet.

14. The sensor of claim 1 wherein said enhancing means is characterized by altering said contact resistance between said resistive sheet and said further sheet such that a differentiation of levels is achieved between a finger pressure/force of about 5 to about 20 oz/in$^2$ needed for generating said X- and Y-coordinate signals, and a low Z-coordinate signal and levels of greater pressure/force to produce an increased Z-coordinate signal.

15. The sensor of claim 8 wherein said resistive layer of said resistive sheet has a uniform resistivity selected from a range of 50 to about 20,000 ohms per square, and said resistivity of said enhancing material is greater than about 30K ohm-cm, and said further sheet is conductive.

16. The sensor of claim 9 wherein said resistive layers of said resistive sheet and said further sheet have a selected resistivity in a range from 50 to 20,000 ohms per square, and said enhanging material is a grid applied to one of said resistive layers, said enchanging material having a resistivity greater than 30K ohm-cm.

17. An electrographic touch sensor for generating signals of two-dimension coordinates of a contact point on said sensor, and having a capability of generating signals related to pressure/force applied at such point, which comprises:

means for generating orthogonal electrical potentials within such sensor, said means having a uniform resistive layer and electrodes attached to said resistive layer to accept voltages to produce said orthogonal fields, said means having at least one exposed surface, said means further adapted to generate such signals of two-dimension coordinates of such contact point;

an array of high resistance material applied to said exposed surface of said means, the resistivity value of said material of said array being substantially greater than the resistivity value of said resistive layer, said array having a selected configuration and covering a selected portion of said exposed surface;

a conductive sheet, having a first surface and a further surface, proximate said array with said first surface toward said array;

whereby a pressure/force applied to such sensor at such point causes said first surface of said conductive sheet to make contact with at least said array and thereby generate such signals of such two-dimension coordinates of such point, and such signal of a third coordinate related to a change of effective contact resistance between said resistive layer and said conductive sheet at such point, as enhanced by said array, produced by said pressure/force.

18. The sensor of claim 17 wherein said means for generating said orthogonal electrical potentials is a single uniform resistive layer, defining a perimeter, provided with spaced-apart electrodes in contact with said layer and arranged along said perimeter and adapted to receive said voltages, said resistive layer applied to a supporting substrate.

19. An electrographic touch sensor for generating signals of X- and Y-coordinates of a contact point on said sensor, and having a capability of generating signals related to a pressure/force related Z-coordinate of such point, which comprises:

a substrate;

a uniform resistive coating applied to said substrate, said coating having perimeter edges;

electrode means in contact with said resistive coating proximate said perimeter edges whereby orthogonal electrical fields are generatable in said coating upon the application of voltages to said electrode means;

an array of material applied to said resistive coating, the resistivity value of said material of said array being substantially greater than the resistivity value of said resistive coating, said array having a selected configuration;

a flexible conductive sheet, having a first surface and a further surface, proximate said array with said first surface toward said array;

whereby a sufficient pressure/force applied to said further surface of said conductive sheet at such contact point produces contact of said first surface of said conductive sheet with at least said array of said material and thereby generates signals in said conductive sheet corresponding to such two dimension coordinates of such point, and independently generates a signal in said conductive sheet corresponding to a reduced contact resistance between said first surface of said conductive sheet and said resistive coating as a function of said pressure/force applied at such point and thus to such third coordinate.

20. The sensor of claim 19 wherein said array is formed of perpendicularly oriented lines of high resistivity material defining rectangular open areas between said lines.

21. The sensor of claim 19 wherein said array is a resistance layer provided with substantially circular openings.

22. The sensor of claim 19 wherein said array is a distribution of an insulator material.

23. The sensor of claim 19 further comprising:
voltage supply means;
sequencing means for connecting said voltage supply means to said electrode means to generate said orthogonal fields in said uniform resistive layer;
circuit means for receiving and processing said signals introduced into said conductive sheet corresponding to said X- and said Y-coordinates of such contact point; and
further circuit means for receiving and processing said signal introduced into said conductive sheet corresponding to said pressure/force and thus to said Z-coordinate of such contact point.

24. The sensor of claim 19 wherein said flexible conductive sheet is applied to a insulative flexible cover sheet on a side toward said array.

25. The sensor of claim 24 wherein said cover sheet is a elastomeric membrane.

26. The sensor of claim 19 wherein said electrode means comprises:
a plurality of contact pads spaced along each of said perimeter edges;

a plurality of diodes, each of said diodes having a first lead connected to one of said contact pads and a further lead;

trace leads connected to appropriate of said further diode leads; and terminals on said trace leads for the application of said voltages to said contact pads for said generation of said orthogonal electrical fields in said resistive coating.

27. The sensor of claim 19 wherein said electrode means comprises:
a plurality of contact pads spaced along each said perimeter edges;
a resistor array proximate each of said perimeter edges having terminals for the application of said voltages; and
leads connecting each of said contact pads to a selected point along said resistor array whereby selected voltages are applied to said contact pads upon application of said voltages to said resistor arrays for said generation of said orthogonal electrical fields in said resistive coating.

28. A method for obtaining a signal corresponding to pressure/force applied to an electrographic touch sensor at a selected point, such sensor of the type having a pair of closely disposed layers, at least one of such layers being a resistive layer having a selected uniform resistivity value, such sensor adapted to provide signals corresponding to the X- and Y-coordinates of such selected point, said method comprising:
applying a distributed array of enhancing material between such layers, the resistivity value of said material of said array being substantially greater than such selected resistivity value of such resistive layer;
generating orthogonal electrical fields in such sensor;
obtaining signals generated in such layers corresponding to such X- and Y-coordinates upon applying such pressure/force at such selected point; and
obtaining a further signal, generated during a separate time interval, related to a change in effective contact resistance between such layers upon application of such pressure/force at such selected point, said further signal increasing as a function of such pressure/force applied to such sensor at such point as said effective contact resistance is reduced upon an increase in said pressure force.

29. The method of claim 28 wherein said array of said enhancing material reduces the change in effective contact resistance for a given pressure/force at such point as compared to the absence of said enhancing material thereby enabling a differentiation between values of pressure/force.

30. The method of claim 28 wherein said resistive layer has a selected resistivity of between about 50 and about 20,000 ohms per square, and said enhancing material has a resistivity of at least 30K ohm-cm.

* * * * *